(12) United States Patent
Ehlert

(10) Patent No.: US 7,628,264 B2
(45) Date of Patent: Dec. 8, 2009

(54) TRANSFER DEVICE FOR WORKPIECES AND METHOD FOR THE TRANSFER OF WORKPIECES

(75) Inventor: Hilmar Ehlert, Stansstad (CH)

(73) Assignee: Komax Holding AG, Dierikon (CH)

( * ) Notice: Subject to any disclaimer, the term of this patent is extended or adjusted under 35 U.S.C. 154(b) by 7 days.

(21) Appl. No.: 11/953,155

(22) Filed: Dec. 10, 2007

(65) Prior Publication Data
US 2008/0149458 A1 Jun. 26, 2008

(30) Foreign Application Priority Data
Dec. 20, 2006 (EP) .................................. 06126714

(51) Int. Cl.
*B23Q 17/22* (2006.01)
*B65G 35/06* (2006.01)
(52) U.S. Cl. ............................. 198/341.01; 198/341.05; 198/465.1
(58) Field of Classification Search ............ 198/341.01, 198/341.05, 345.1–345.3, 465.1, 810.03
See application file for complete search history.

(56) References Cited
U.S. PATENT DOCUMENTS
4,209,898 A * 7/1980 Aoki et al. .................. 29/783
4,475,642 A * 10/1984 Fritz ........................ 198/345.3
4,800,818 A 1/1989 Kawaguchi et al.

FOREIGN PATENT DOCUMENTS

| EP | 0 340 639 A | 11/1989 |
|---|---|---|
| EP | 0 340 693 A | 11/1989 |
| EP | 0 704 391 A | 4/1996 |
| EP | 1 275 601 A | 1/2003 |
| EP | 1 491 466 A | 12/2004 |
| GB | 2 185 720 A | 7/1987 |

* cited by examiner

*Primary Examiner*—Mark A Deuble
(74) *Attorney, Agent, or Firm*—Fraser Clemens Martin & Miller LLC; William J. Clemens

(57) ABSTRACT

A transfer device using a workpiece carrier to feed workpieces to workstations for processing. The workpieces are held firmly on the workpiece carrier by a holding device (3.1). Provided on a transfer table are guiderails that serve the linear guidance of the workpiece carrier in the "x" direction. Provided for each work station is a drive with a motor and a driving wheel that drives a double-sided toothed belt which in turn engages in a toothing of the workpiece carrier. A scale is arranged on the workpiece carrier and a stationary sensor form a position emitter whose signal enables the precise positioning of the workpiece carrier.

13 Claims, 3 Drawing Sheets

TRANSFER DEVICE FOR WORKPIECES AND METHOD FOR THE TRANSFER OF WORKPIECES

FIELD OF THE INVENTION

The present invention relates to a transfer device for workpieces, which for the purpose of processing can be fed by means of at least one workpiece carrier to at least one work station, at least one drive being provided that moves the workpiece carriers linearly according to the definition of the independent device claim. The present invention also relates to a method for the transfer of workpieces.

BACKGROUND OF THE INVENTION

From patent application EP 0 340 639 an assembly system for subassemblies has become known. By means of belts, a central drive drives receptacles that carry subassemblies and move the subassemblies from workstation to workstation. The receptacles are provided with a coding that can be scanned by means of a sensor. For the purpose of positioning a receptacle, the sensor signal is fed to the control of the drive. The sensor signals of the other receptacles are used to ascertain the position of the receptacles within the assembly system. It is here that the present invention sets out to provide a remedy. The present invention solves the problem of creating a device and a method that makes a precise transfer of workpieces possible.

SUMMARY OF THE INVENTION

With the transfer device according to the present invention, workpieces are fed by means of at least one workpiece carrier to at least one workstation for the purpose of processing, at least one drive being provided that moves the workpiece carriers linearly, and for each drive at least one position emitter being provided that registers the exact position of the workpiece carrier.

The advantages that are obtained are mainly that with the transfer device according to the present invention, inadequacies of the drive means as, for example, toothed belts, can be largely neutralized. Although transfer drives with toothed belts can be manufactured very inexpensively and easily, toothed belts possess spring properties and manufacturing tolerances that negatively affect the accuracy of the transfer of workpieces. Especially on reversal, the elasticity and play of the toothed belt causes a deviation of up to 0.1 mm on the positional accuracy. During the transfer operation, the workpiece or workpiece carrier is transferred into a destination area with a lower resolution of the motor position emitter that is present in any case. In the destination area, a higher resolution of a further position emitter, and thus a precise positioning of the workpiece carrier, is provided, in the destination area the driving means having no further influence on the accuracy of the positioning of the workpiece carrier. Overall, a more dynamic and very precise transfer of workpieces is thus possible.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
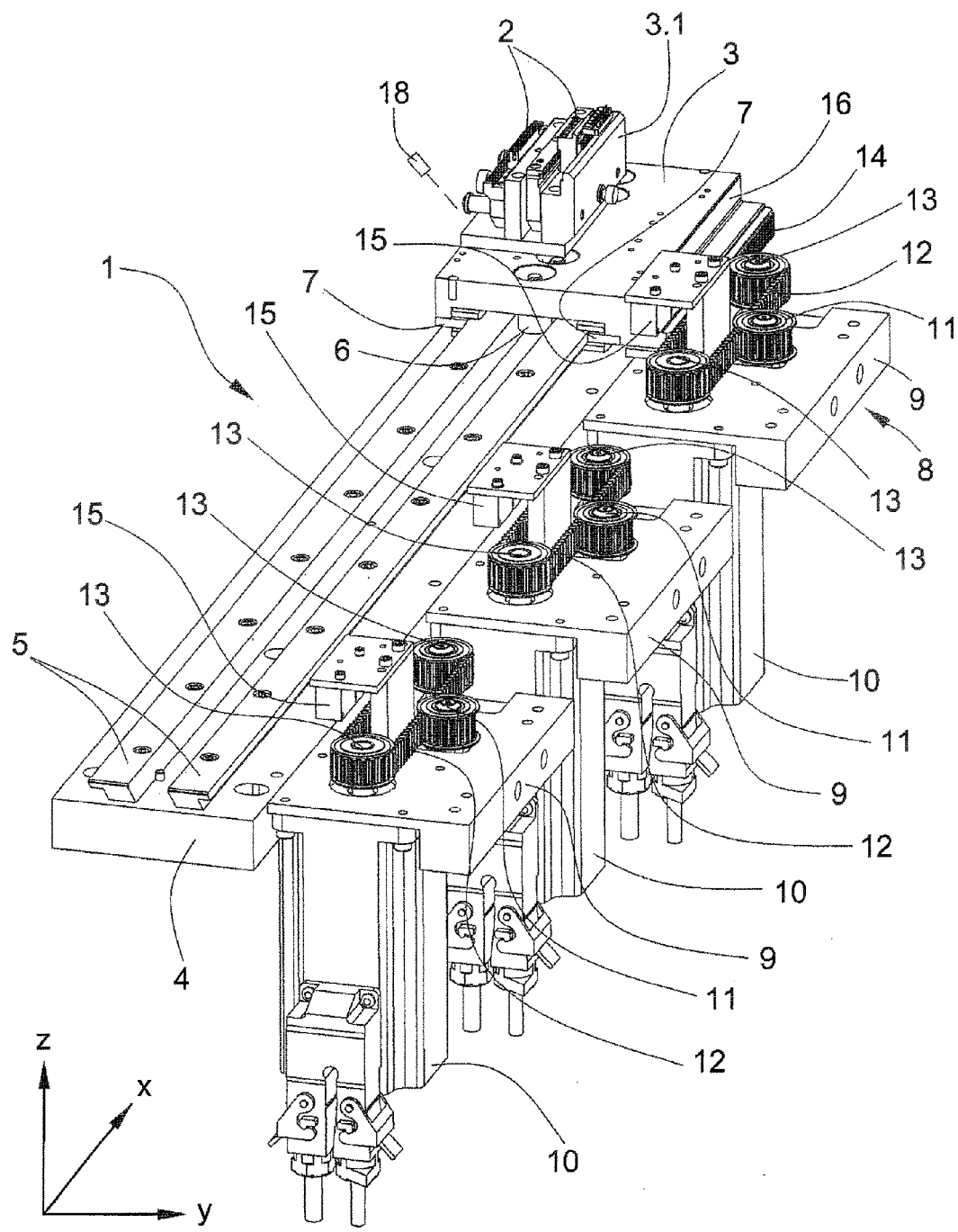
FIG. 1 a perspective view of a transfer device for workpieces according to the present invention.

FIG. 1 shows a transfer device 1 for workpieces 2 that for the purpose of processing can be fed by means of at least one workpiece carrier 3 to at least one not-shown workstation. The workpieces 2 are held firmly by means of a holding device 3.1. Provided on a transfer table 4 are guiderails 5 that serve to guide the workpiece carrier 3 linearly in the "x" direction, guide rollers 6 acting in the "y" direction and sliding guides 7 in the "z" direction.

Provided for each workstation and arranged on the transfer table 4 is a drive console 9 with a drive 8. The drive 8 consists of a motor 10 with a drive wheel 11 that drives a driving means 12, for example a double-sided toothed belt. The drive belt 12 is passed over two reversing wheels 13, the toothed belt 12 engaging in a toothing 14 of the workpiece carrier 3. With the drive 8, the workpiece carrier 3 can be moved backwards and forwards in the "x" direction. On transfer of the workpiece carrier 3 from one drive to another drive, the one drive moves the workpiece carrier 3 until the latter engages with the toothed belt of the other or adjacent drive, both drives being synchronized with regard to rotational speed and teeth when handing over or taking over. The rotational movement of the motor and of the motor shaft are registered by means of a sensor, for example an encoder 21 (FIG. 3) arranged on the motor, and fed to a drive regulator and a position regulator. The encoder that is required for the synchronization is an inexpensive commercial product.

Figure 2:
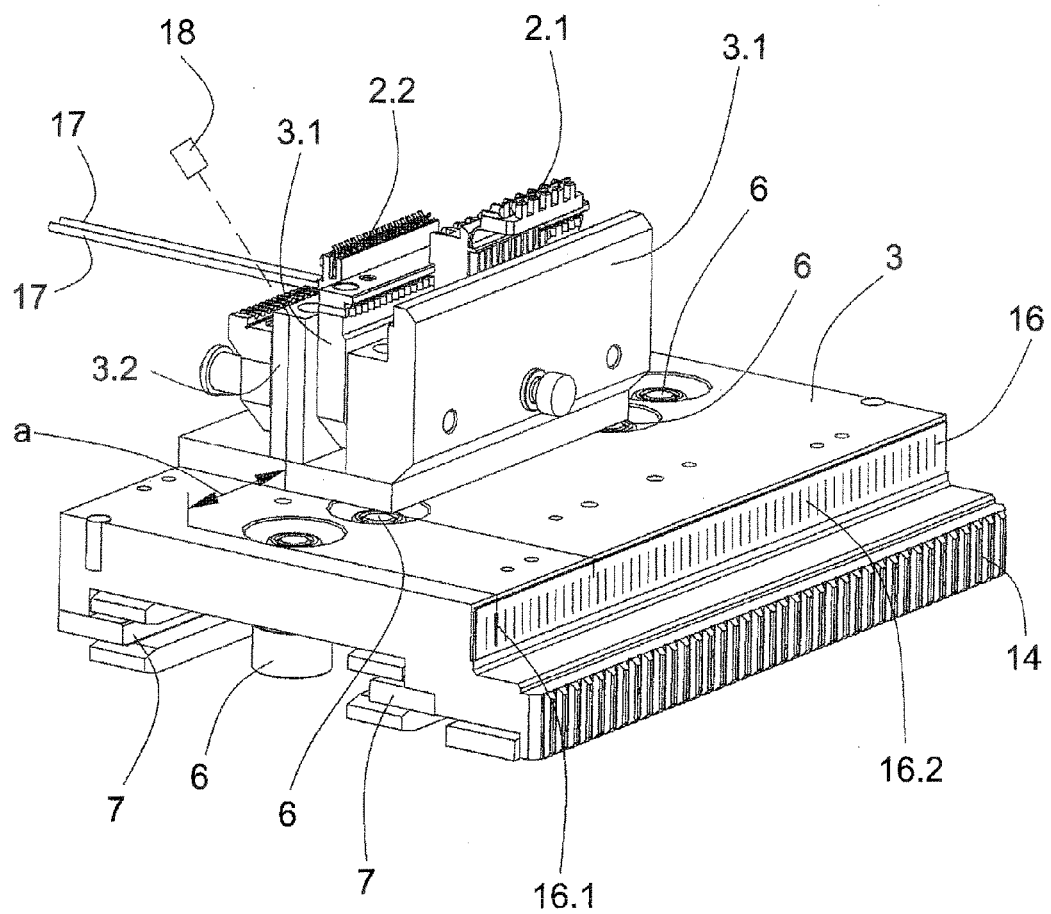
FIG. 2 is a detailed perspective view of a workpiece carrier of the transfer device shown in FIG. 1.
Figure 3:
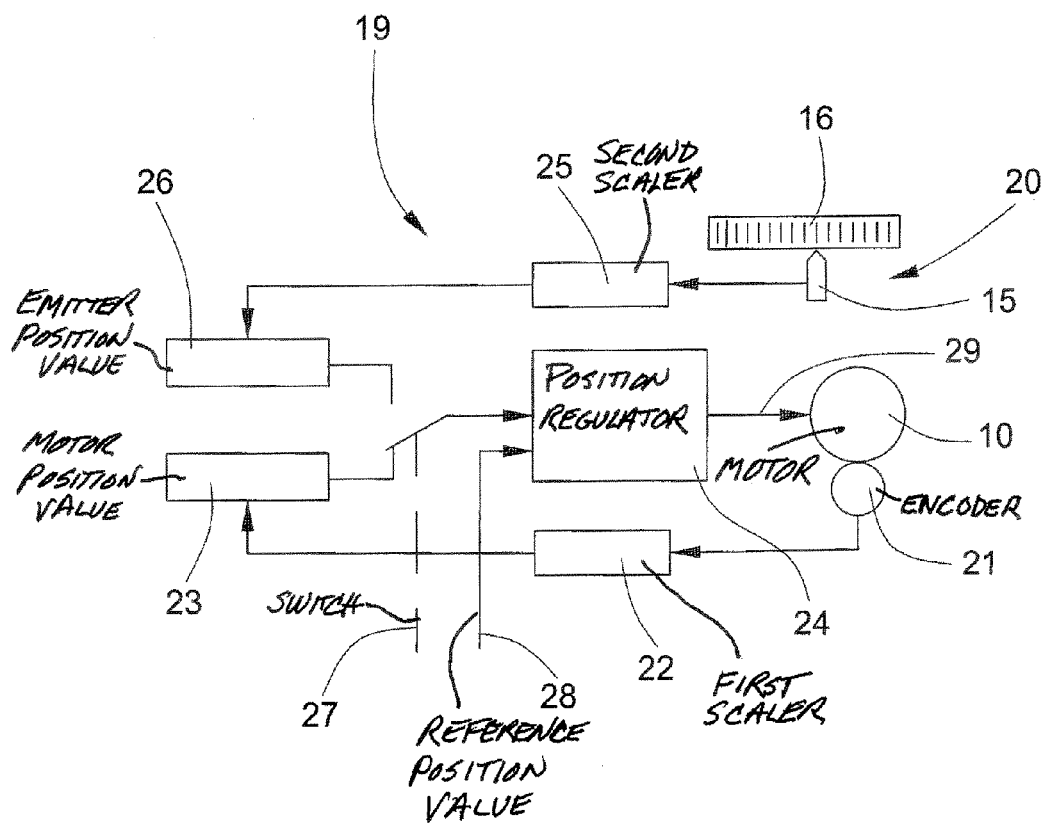
FIG. 3 is a flowchart of a position scale for the workpiece carrier.

FIG. 2 shows details of the workpiece carrier 3. Arranged on the workpiece carrier is a code carrier, for example an optical or magnetic scale 16, whose code is readable by means of a first sensor 15 (FIG. 1) that is permanently arranged on the drive console 9 of the drive. The scale 16 and the first sensor 15 form a position emitter 20 (FIG. 3). Usually, for each work station on which precise work processes are foreseen, or on the corresponding drive, the first sensor 15 is provided. In the transfer device 1 shown in FIG. 1, for each of the work stations the first sensor 15 is provided, each of which together with the scale 16 of the workpiece carrier 3 forms the position emitter 20. In the case of small and/or narrowly arranged work stations, and depending on the length of the toothed belt, a drive 8 can be provided for more than one work station.

As shown in FIG. 1, the workpiece carrier 3 stands in front of the first work station. In this position, the distance "a" (FIG. 2) of the holding device 3.1 from the reference mark 16.1 is determined. Serving this purpose are a permanently arranged second sensor 18, the first sensor 15, the scale 16, and the drive 8. The workpiece carrier 3 is moved by means of the drive 8 until the first sensor 15 detects the reference mark 16.1. The workpiece carrier 3 is then moved by means of the drive 8 until the second sensor 18 detects a conspicuous point of the workpiece 2 or of the holding device 3.1, for example an edge 3.2. The number of marks 16.2 of the scale 16 that are thereby detected corresponds to the distance "a". The value "a" is transmitted to the associated drive regulator of the measured workpiece carrier 3. Each first sensor 15 is precisely arranged on its drive console 9 exactly the same as the first sensor 15 that determines the distance "a". Should the position of the scale 16 vary from workpiece carrier to workpiece carrier, the distance "a" also varies, which, however, has no effect on the accuracy of the work process. Should a manual or mechanical determination of the distance "a" suffice, the above-mentioned measurement operation is obviated. The distance "a" is then measured mechanically and transmitted to the drive regulator.

As the workpiece 2, the workpiece carrier 3 according to FIG. 2 carries a first plug housing 2.1 and a second housing 2.2, and a work-process cable 17 being inserted horizontally into the second plug housing 2.2. In the first cable housing 2.1, the cables are inserted vertically from above. Besides cable-end processing, the transfer device 1 can also be used, for example, for assembly processes or stamping processes for flat cables.

FIG. 3 shows a flowchart of a position regulator 19 for the workpiece carrier 3. The rotational movement of the motor 10 and of the motor shaft are registered by means of a sensor, for example the encoder 21 arranged on the motor, and the encoder signal fed to a first scaler 22 that converts the signal into a measurement unit. The measurement unit is then available as a motor position value 23 of the motor 10 for a position regulator 24. The signal of the position emitter 20 is forwarded to a second scaler 25 that converts the signal into a measurement unit. The measurement unit is then available as an emitter position value 26 of the position emitter 20 for the position regulator 24. A changeover switch 27 feeds either the actual position value 23 of the motor 10 or the position value 26 of the position emitter 20 to the position regulator 24. A reference position value that is fed to the position regulator 24 is referenced with 28. The position regulator 24 energizes the motor 10, that moves the workpiece carrier 3, with a control signal 29.

The destination or reference position value 28 that should be traveled to by the workpiece carrier 3 is specified. During transfer of the workpiece carrier 3 into its destination, the position regulator 24 continuously performs a comparison between the reference position value 28 and the actual position value 23 of the motor 10, the workpiece carrier being moved dynamically but imprecisely into a destination area. The resolution of the encoder 21 is several times smaller than the resolution of the scale 16. For example, the resolution of the encoder 21 is approximately five times less than the resolution of the scale 16. The resolution of the encoder 21 is, for example, 25 µm and the resolution of the scale 16 is, for example, 5 µm. The resolution of the scale 16 can, however, be selected even smaller. The switchover 27 then feeds the position value 26 of the high-resolution position emitter 20 to the position regulator 24 which then moves or finely positions the workpiece carrier 3 precisely into the destination, the elasticity and play of the toothed belt having no more influence on the positioning accuracy. In further destination travels with the same workpiece carrier 3, only the actual position value 26 of the position emitter 20 is fed to the position regulator 24. The positioning accuracy with the encoder signal is approximately 100 µm. Without the inaccuracies of the toothed belt, the positioning accuracy with the position emitter signal of the position emitter 20 is approximately 5 µm.

During transfer of the workpiece carrier 3 from one drive to another drive, the actual motor position value 23 of the one motor 10 is used as actual position value, since the code carrier or scale 16 of the workpiece carrier 3 leaves the one sensor 15. The other motor 10 is synchronized with the one motor, and the other motor regulator adopts the destination of the one motor regulator. As soon as the other sensor 15 detects the reference mark 16.1 of the scale 16, the marks 16.2 of the scale 16 that are moving past the other sensor 15 are counted. On reaching the destination, based on the reference motor position value 23, the fine positioning with the actual position value of the position emitter 20 is executed.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A transfer device for workpieces that for the purpose of processing are feedable by at least one workpiece carrier to at least one workstation, and at least one drive that moves the workpiece carriers linearly, comprising:
   a sensor for generating an actual motor position value signal from registering rotational motion of a motor of the at least one drive;
   a position emitter associated with the at least one drive for registering a position of the workpiece carrier and generating an actual emitter position value signal; and
   a position regulator being responsive to said actual motor position value signal for controlling the motor prior to the workpiece carrier reaching a destination area and being responsive to said actual emitter position value signal for controlling the motor when the workpiece carrier is in the destination area.

2. The transfer device according to claim 1 wherein said position emitter has a stationary sensor that detects a code of a code carrier that is arranged on the workpiece carrier.

3. The transfer device according to claim 2 wherein said position regulator processes either said actual emitter position value signal, or said actual motor position value signal, together with a reference position value, into a control signal and wherein the control signal energizes the motor of the at least one drive that moves the workpiece carrier.

4. The transfer device according to claim 3 wherein a resolution of said position emitter is a multiple of a resolution of said sensor that registers the rotational motion of the motor.

5. The transfer device according to claim 1 wherein said position emitter has a stationary sensor and a scale that is arranged on the workpiece carrier and that is scanned by said stationary sensor.

6. The transfer device according to claim 5 wherein said scale has a resolution of at least 5 µm.

7. The transfer device according to claim 1 wherein the workpieces are feedable by said at least one workpiece carrier to a plurality of workstations and each said work station has an associated drive.

8. A method for the transfer of workpieces with a transfer device comprising the steps of:
   operating the transfer device to transfer the workpiece along a transfer path on a workpiece carrier into a destination area;
   generating a signal that corresponds to a rotational movement of a motor shaft of a motor moving the workpiece carrier;
   using the signal as an actual motor position value to control the motor; and on reaching the destination area, using a signal of a position emitter registering a position of the workpiece carrier as an actual emitter position value to control the motor, the workpiece carrier being moved into the destination area by the motor.

9. The method according to claim 8 wherein the signal of the position emitter as the actual emitter position value or the signal of a sensor that registers the rotational motion of the motor or of the motor shaft as the actual motor position value is processed together with a reference position value to generate a control signal and using the control signal to energize the motor of a drive that moves the workpiece carrier.

10. The method according to claim 9 wherein a positioning accuracy with the actual motor position value is approximately 100 μm and a positioning accuracy with the emitter position value is approximately 5 μm.

11. The method according to claim 9 wherein during a transfer of the workpiece carrier from one drive to another drive the actual motor position value of the motor of the one drive is used as the actual position value and that a motor regulator of the another drive adopts the destination of a regulator of the one motor and that as soon as another sensor detects a reference mark of a scale on the workpiece carrier, marks of the scale that are moving past the another sensor are counted and that on reaching a destination based on the actual motor position value, fine positioning is executed with the actual position value of the position emitter.

12. The method according to claim 8 wherein including determining a position of the workpiece on the workpiece carrier by moving the workpiece carrier to a reference mark of a code carrier and then moving further, until a stationary sensor detects a conspicuous point of the workpiece, a path from the reference mark to the conspicuous point being measured by the position emitter.

13. A method for the transfer of workpieces with a transfer device comprising the steps of:
   operating the transfer device to transfer the workpiece along a transfer path on a workpiece carrier into a destination area;
   generating a signal that corresponds to a rotational movement of a motor shaft of a motor moving the workpiece carrier;
   using the signal as an actual motor position value to control the motor; and
   on reaching the destination area, using a signal of a position emitter as an actual emitter position value to control the motor, the workpiece carrier being moved into the destination area, and including determining a position of the workpiece on the workpiece carrier by moving the workpiece carrier to a reference mark of a code carrier and then moving further, until a stationary sensor detects a conspicuous point of the workpiece, a path from the reference mark to the conspicuous point being measured by the position emitter.

\* \* \* \* \*